(12) United States Patent
Kumar et al.

(10) Patent No.: US 8,140,901 B2
(45) Date of Patent: Mar. 20, 2012

(54) VALIDATION OF PROCESSORS USING A SELF-GENERATING TEST CASE FRAMEWORK

(75) Inventors: Prathiba Kumar, Bangalore (IN); Satish Kumar Sadasivam, Bangalore (IN); Srinivasan Subramanian, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 12/627,618

(22) Filed: Nov. 30, 2009

(65) Prior Publication Data

US 2011/0131452 A1 Jun. 2, 2011

(51) Int. Cl.
*G06F 11/00* (2006.01)
(52) U.S. Cl. .......................................... 714/27
(58) Field of Classification Search ................ 714/48, 714/34, 26, 27; 712/227
See application file for complete search history.

(56) References Cited

U.S. PATENT DOCUMENTS

| | | | |
|---|---|---|---|
| 4,611,320 A * | 9/1986 | Southard | 370/241 |
| 5,740,353 A | 4/1998 | Kreulen et al. | |
| 6,401,220 B1 * | 6/2002 | Grey et al. | 714/33 |
| 7,028,067 B2 | 4/2006 | Abraham et al. | |
| 7,140,003 B2 | 11/2006 | Decker | |
| 7,356,436 B2 | 4/2008 | Bohizic et al. | |
| 7,392,441 B2 | 6/2008 | Kehne et al. | |
| 7,398,515 B2 | 7/2008 | Atoji et al. | |
| 7,409,592 B2 | 8/2008 | Decker | |
| 2005/0114839 A1 * | 5/2005 | Blumenthal et al. | 717/124 |
| 2005/0188271 A1 * | 8/2005 | West et al. | 714/38 |

FOREIGN PATENT DOCUMENTS

WO 2007081979 A2 7/2007

OTHER PUBLICATIONS

Foster, Todd J.; Lastor, Dennis; Singh, Padmaraj; "First Silicon Functional Validation and Debug of Multicore Microprocessors;" IEEE Transactions on Very Large Scale Integration (VLSI) Systems; vol. 15, No. 5; May 5, 2007; pp. 495-503.
Clarke, Peter J.; Cruz, Rodolfo; King, Tariq M; Ramirez, Alain E.; "An Integrated Self-Testing Framework for Autonomic Computing Systems;" Journal of Computers, vol. 2, No. 9; Nov. 2007; pp. 37-49; Academy Publishers.
Bertacco, Valeria; Deorio, Andrew; Wagner, Ilya; "DACOTA: Post Silicon Validation of the Memory Subsystem in Multi-Core Designs;" IEEE Xplore; 2008; pp. 405-416.
Bertacco, Valeria; Wagner, Ilya; "Reversi: Post Silicon Validation System for Modern Microprocessors;" IEEE Xplore; 2008; pp. 307-314.
Igor, Frumkin; Robert, Mauri, Tommy, Bojan; "Intel's Post Silicon Functional Validation Approach;" IEEE Xplore 2007; pp. 53-56.

\* cited by examiner

*Primary Examiner* — Scott Baderman
*Assistant Examiner* — Yair Leibovich
(74) *Attorney, Agent, or Firm* — D'Ambrosio & Menon, LLP; Usha Menon; Srikant Viswanadham

(57) ABSTRACT

A method for testing processors is disclosed. The method includes generating a plurality of pools, where each pool includes a test program that includes a plurality of test cases, and setting a flag for each of the plurality of pools indicating that the pool is ready to be executed. Each processor performs a pool execution cycle a predetermined number of times. The pool execution cycle includes selecting a pool that is ready to be executed and unsetting the flag for the selected pool, performing an execution cycle of the test program included in the selected pool, and setting the flag indicating that the pool is ready to be executed upon completion of the execution cycle of the test program. The execution cycle of the test program includes regenerating a test case to create a new case that is flagged as the next test case for execution in the execution cycle.

23 Claims, 10 Drawing Sheets

VALIDATION OF PROCESSORS USING A SELF-GENERATING TEST CASE FRAMEWORK

BACKGROUND

Verification of the various execution units of microprocessor systems is a significant challenge. The computing power and complex functionality associated with microprocessor systems are increasing exponentially. Existing verification tools are ineffective in meeting all of the challenges of processor verification as these tools devote considerable more time to building and simulation of the test program to verify the functionality of the architecture of the processor rather than the testing itself. The invention relates generally to functional testing and validation of processors. More specifically, the invention relates to functional testing and validation of processors using an integrated self-generating test case framework.

SUMMARY

In accordance with an embodiment of the invention, a method for creating a self-generating test program is disclosed. The method includes generating a plurality of groups of instructions and storing the groups of instructions in an instruction group table, where instructions sharing a same instruction format are included in a same group, generating a plurality of test cases and storing information pertaining to each test case in a test program information table, where each test case includes one or more instructions from one or more of the plurality of groups, and performing an execution cycle. The execution cycle includes selecting a current test case for execution, such that if a test case has been flagged as the next test case to execute in the execution cycle, the flagged test case is selected as the current test case, executing the current test case, and introducing a break in execution of the current test case. During the break in execution, a test case from among the plurality of test cases that is different from the current test case is selected, a new test case is generated from the selected different test case, and a flag is assigned to the new test case that indicates that the new test case is the next test case to execute in the execution cycle. Thereafter, execution of the current test case is resumed. The execution cycle is repeated on the condition that an execution result of the current test case is validated.

In accordance with one or more embodiments of the invention, the generation of a new test case includes replacing each instruction referenced by an instruction address in a portion of the test program information table pertaining to the selected different test case with a randomly selected instruction from a same group based on information retrieved from the instruction group table.

In accordance with one or more embodiments of the invention, the test program information table includes header information that specifies a number of test cases included in the test program information table, and information pertaining to each test case that is included in the test program information table. The information pertaining to each test case includes a base address of each group of instructions included in the test case, an AND mask for each of group of instructions included in the test case, an instruction count that specifies a number of instructions included in the test case from each group of instructions, and an address of each instruction included in the test case.

In accordance with another embodiment of the invention, a system for performing functional testing of processors is disclosed. The system includes a plurality of processors and a test program generator. The test program generator generates a plurality of self-generating test programs, each self-generating test program having an instruction group table and a test program information table associated therewith, and generates a plurality of pools, wherein each pool includes one of the plurality of self-generating test programs and the associated instruction group table and test program information table. Each of the plurality of pools has a flag associated therewith that is initially set to indicate that the pool is ready to be executed, and each processor performs a pool execution cycle one or more times. The pool execution cycle includes selecting a pool that is ready to be executed from among the plurality of pools and unsetting the flag associated with the selected pool, performing an execution cycle of the self-generating test program included in the selected pool, and setting the flag indicating that the pool is ready to be executed upon completion of the execution cycle of the self-generating test program.

In accordance with another embodiment of the invention, a computer-readable medium storing a computer program that includes instructions for causing a computer to perform a process is disclosed. The process includes generating a plurality of self-generating test programs, each self-generating test program having an instruction group table and a test program information table associated therewith, generating a plurality of pools, where each pool includes one of the plurality of self-generating test programs and the associated instruction group table and test program information table, and each of the plurality of pools has a flag associated therewith that is initially set to indicate that the pool is ready to be executed, and performing a pool execution cycle one or more times. The pool execution cycle includes selecting a pool that is ready to be executed from among the plurality of pools and unsetting the flag associated with the selected pool, performing an execution cycle of the self-generating test program included in the selected pool, and setting the flag indicating that the pool is ready to be executed upon completion of the execution cycle of the self-generating test program.

These and other embodiments of the invention are described in detail with reference to the following drawings.

DETAILED DESCRIPTION

Figure 1:
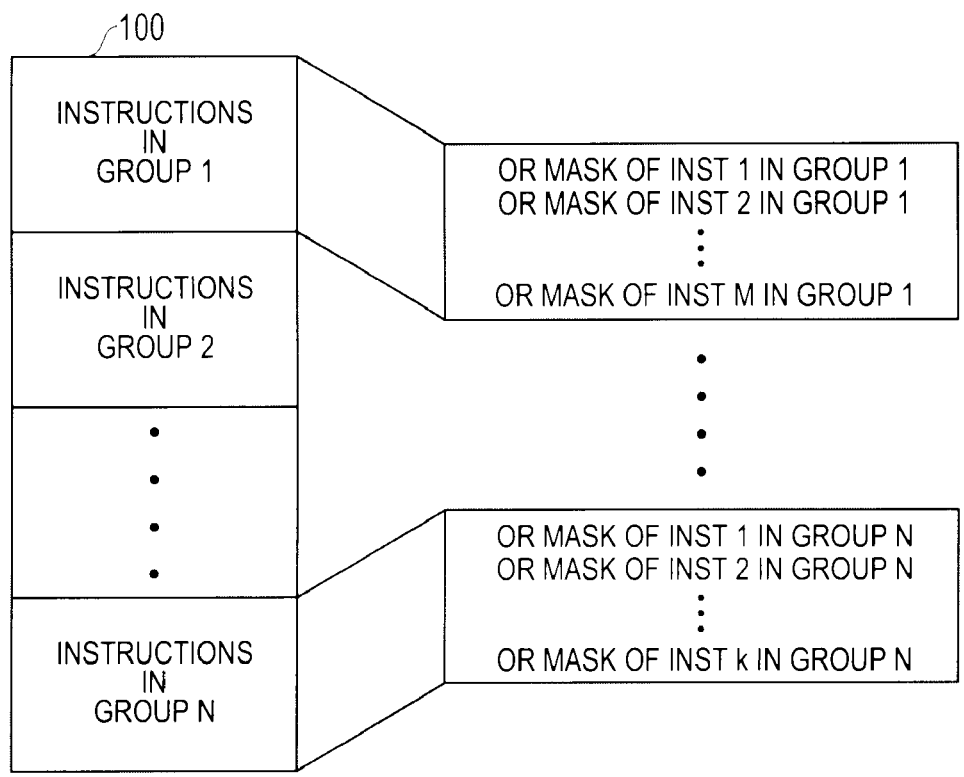
FIG. 1 depicts a group instruction table in accordance with one or more embodiments of the invention.

As will be appreciated by one skilled in the art, embodiments of the invention may be embodied as a system, method or computer program product. Accordingly, embodiments of the invention may take the form of an entirely hardware embodiment, an entirely software embodiment (including firmware, resident software, micro-code, etc.) or an embodiment combining software and hardware embodiments that may all generally be referred to herein as a "circuit," "module" or "system." Furthermore, embodiments of the invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Functional verification of execution units of a microprocessor involves the testing of various instructions implemented in the microprocessor. The set of instructions to be tested is often so large that it is impractical to test the instructions using various inputs selected based on a random or pseudo-random methodology. In accordance with one or more embodiments of the invention, a method for generating a self-generating test program that does not have a complicated build logic associated with it and that is capable of regenerating a test case during an execution cycle of the test program is disclosed.

Referring to FIG. 1, in accordance with one or more embodiments of the invention, an instruction group table 100 is constructed that includes a set of instructions that are used to perform functional testing and verification of processors. The instruction group table 100 organizes the instructions into groups based on a format of the instructions. In particular, each instruction sharing a same instruction format is organized into a same group. The number of instructions in each group may vary. In this manner, an instruction in a particular group may be readily replaced with any other instruction in the same group as will be described in more detail hereinafter.

The instruction group table 100 includes, for each group of instructions, an OR mask corresponding to each instruction in the group. An OR mask may include information pertaining to the operation code (opcode) and extended opcode for a particular instruction. In general terms, an opcode is a portion of a machine language instruction that specifies the operation to be performed by the instruction.

In accordance with one or more embodiments of the invention, a test program generator 1010 (shown in FIG. 10) generates one or more self-generating test programs. The terms "self-generating test program" and "test program" are used interchangeably throughout this disclosure. A test program may include a plurality of test cases. Each test case may include one or more instructions from one or more groups of instructions stored in the instruction group table 100 (FIG. 1). Information pertaining to each of the plurality of test cases included in a test program is stored in a test program information table.

Figure 2:
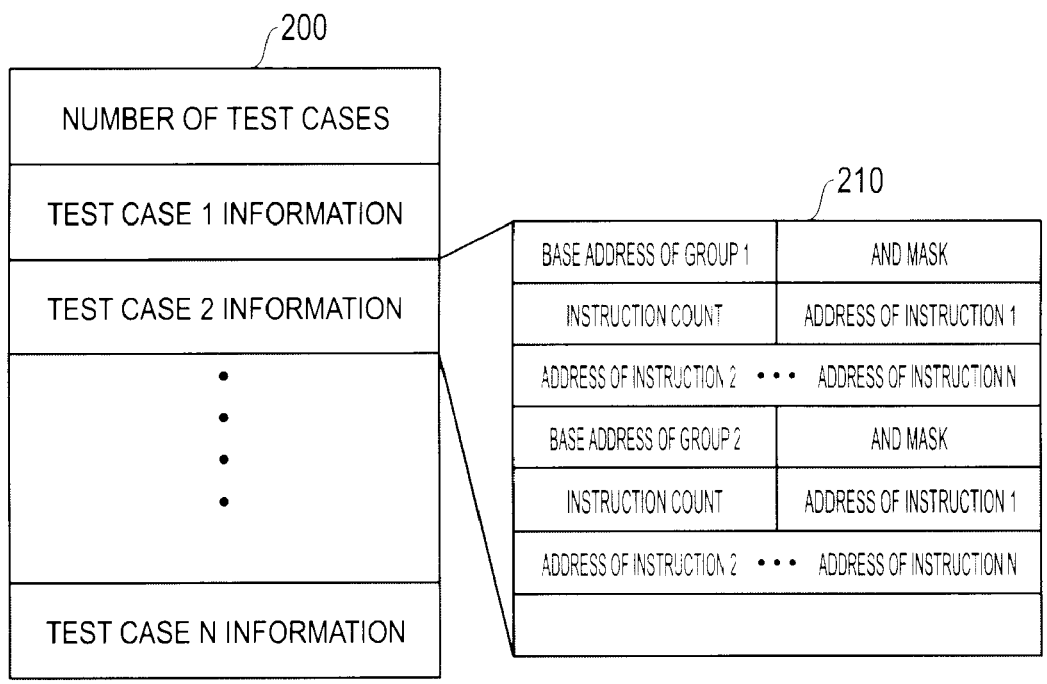
FIG. 2 depicts a test program information table in accordance with one or more embodiments of the invention.

FIG. 2 depicts a test program information table 200 in accordance with one or more embodiments of the invention. The test program information table 200 shown in FIG. 2 includes information pertaining to n different test cases. The number of test cases included in a test program may vary. The information 210 pertaining to each test case may include a base address of each group of instructions included in the test case. The information 210 may further include an AND mask for each group of instructions, an instruction count for each group of instructions that specifies the number of instructions included in the test case for each group of instructions, and an address of each instruction included in the test case. It should be noted that although a same variable (n) is used to denote the number of test cases and the number of instructions included in a particular test case for each group of instructions in the test case, these values may vary. In particular, the number of test cases in a particular test program may differ from the number of instructions included in the test case from a particular group of instructions, which may in turn differ from the number of instructions included in the test case from any other group of instructions.

Figure 3:
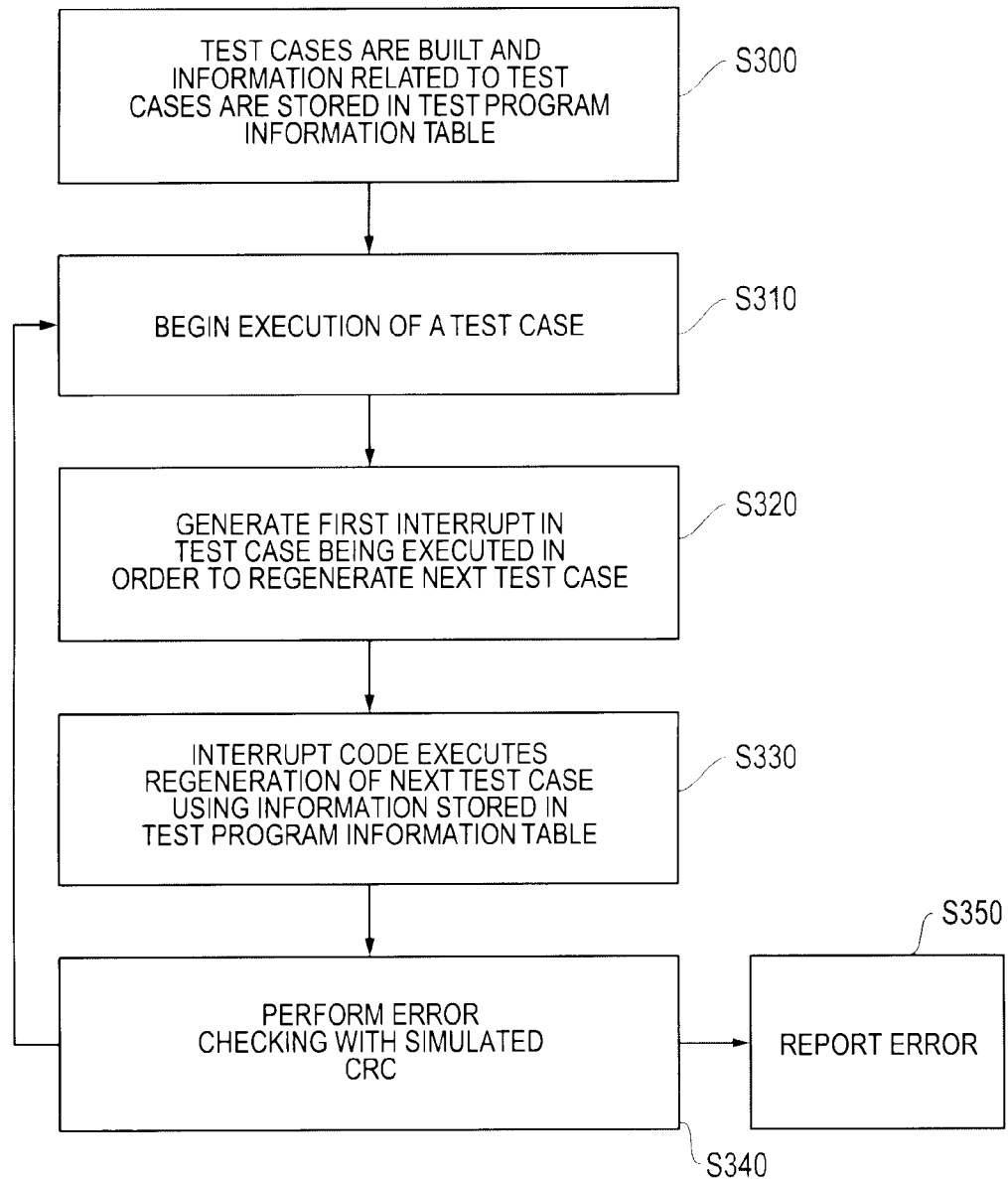
FIG. 3 sets forth a flow chart illustrating a self-generating test program execution cycle in accordance with one or more embodiments of the invention.

FIG. 3 illustrates a flow chart that provides an overview of an execution cycle of a generated test program in accordance with one or more embodiments of the invention. In step S300 of the method, the plurality of test cases included in the test program are constructed and information pertaining to each of the test cases is stored in, for example, the test program information table 200 depicted in FIG. 2. After the plurality of test cases that comprise the test program are constructed, a particular test case among the plurality of test cases is selected and execution of the test case begins (S310). The manner in which the test case is selected for execution will be described in more detail hereinafter.

During execution of the current test case, an interrupt is generated (S320). The interrupt may be a hardware interrupt. During the interrupt, a test case different from the test case currently being executed is chosen for regeneration. In particular, self-generation code may be included as a part of an interrupt handler routine in the test program such that the self-generation code selects a test case different from the test case whose execution was interrupted and regenerates the test case based on information in the test program information table. The test case selected for regeneration is flagged as the next test case to be executed upon completion of the execution of the current test case and validation of the execution results. Thereafter, execution of the current test case is resumed and an execution result of the current test case is validated. In particular, validation is performed by comparing cyclic redundancy check (CRC) results generated by the processor during execution of the current test case to simulated CRC results (S340). If the comparison uncovers an error in the CRC results generated by the processor during execution of the current test case, then the error is reported (S350). If no errors are detected, then execution of the next test case flagged for execution (i.e. the new test case created by regeneration of an existing test case) begins (S310). The method shown in FIG. 3 then continues as described above.

Figure 4:
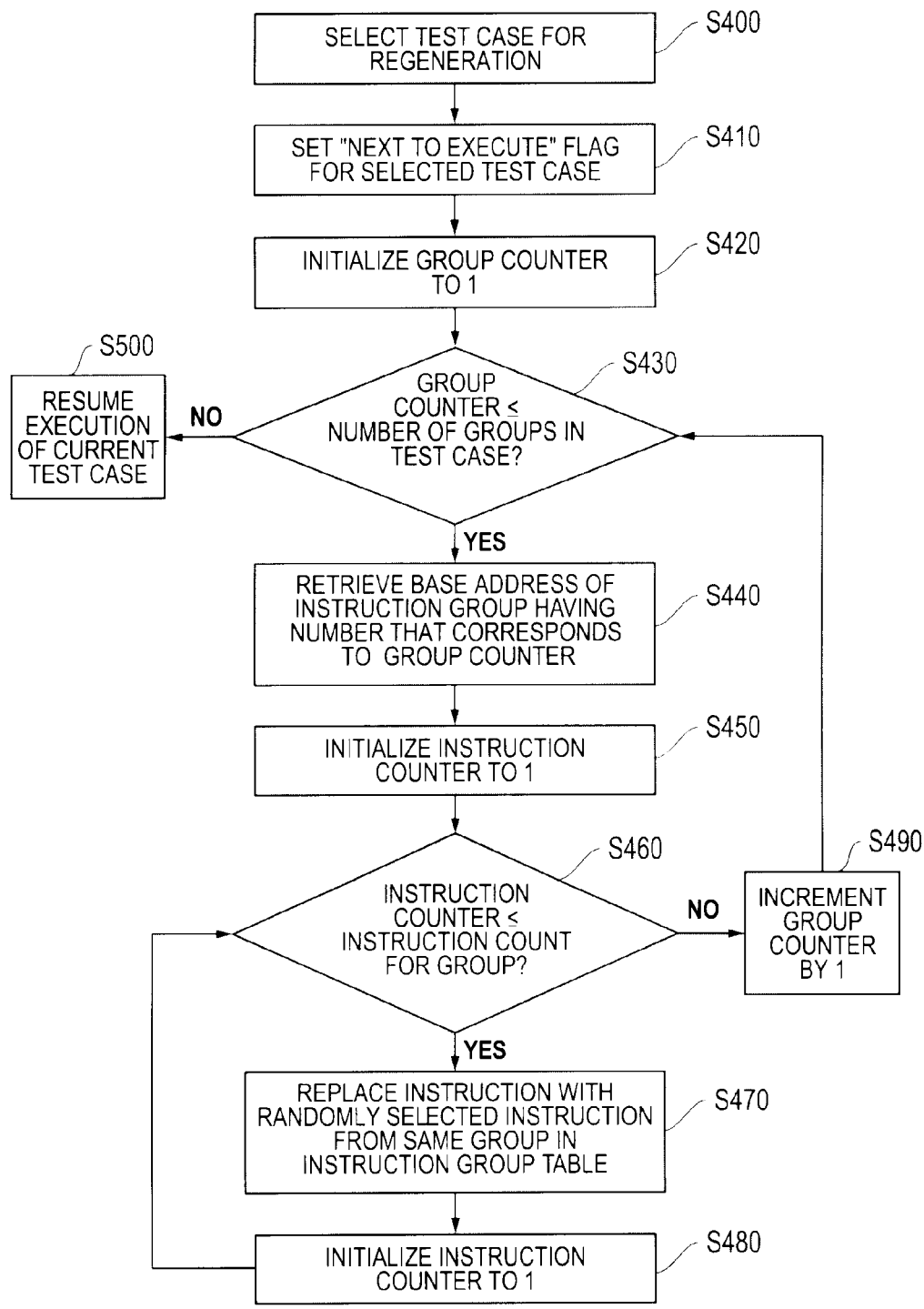
FIG. 4 sets forth a flow chart illustrating a method for regenerating a test case in accordance with one or more embodiments of the invention.

FIG. 4 sets forth a flow chart that illustrates in greater detail the regeneration of a test case in accordance with one or more embodiments of the invention. In step S400, a test case among the plurality of test cases in a test program that is different from the current test case that is being executed is selected. The test case that is selected may be randomly determined. The selected test case is then flagged as the next test case to execute in the execution cycle of the test program upon completion of the execution of the current test case and validation of the execution results (S410). The remaining steps of the method depicted in FIG. 4 detail a possible implementation for regenerating the selected test case.

In particular, the test case may be regenerated by replacing each instruction in the test case with an instruction from the same group of instructions based on information contained in the instruction group table 100 (FIG. 1). Each replaceable instruction in the test case is capable of being replaced with an instruction from the same group of instructions. A replaceable instruction of a test case may correspond to an instruction that is referenced by an instruction address in a portion of the test program information table that pertains to the test case.

As an initial step, a group counter is initialized to a value of 1 (S430). A determination is then made as to whether the group counter exceeds the number of groups of instructions included in the test case selected for regeneration (S430). If it is determined that the group counter does exceed the number of groups of instructions, then regeneration of the selected test case is complete (i.e. the new test case has been created), and execution of the current test case resumes (S500). However, if it is determined that the group counter does not exceed the number of groups of instructions included in the test case selected for regeneration, a base address of the instruction group number corresponding to the group counter is retrieved from the test program information table (S440).

An instruction counter is then initialized to a value of 1 (S450). A determination is then made as to whether the instruction counter exceeds the instruction count for the instruction group whose base address was retrieved (S460). If it is determined that the instruction counter does not exceed the instruction count, then an instruction referenced by an instruction address that corresponds to the instruction counter and that is stored in the test program information table 200 is replaced with an instruction from the same group that is randomly selected from the instruction group table (S470). More specifically, the memory address of the instruction that is stored in the test program information table may be replaced with a memory address of an instruction from the same group randomly selected from the instruction group table. The instruction counter is then incremented by 1 (S480), and a determination is once again made as to whether the instruction counter exceeds the instruction count for the group.

On the other hand, if it is determined that the instruction counter exceeds the instruction count, then all instructions included in the test case for the group whose base address was retrieved in step S440 have been replaced with an instruction from the same group randomly selected from the instruction group table. The group counter is then incremented by 1 (S490), and a determination is once again made as to whether the group counter exceeds the number of groups of instructions included in the test case. In this manner, each replaceable instruction in the test case selected for regeneration is replaced with an instruction from the same group randomly selected from the instruction group table, thereby generating a new test case. It should be noted that FIG. 4 depicts just one of many possible methods for looping through and replacing each instruction in a test case in accordance with one or more embodiments of the invention.

Figure 5:
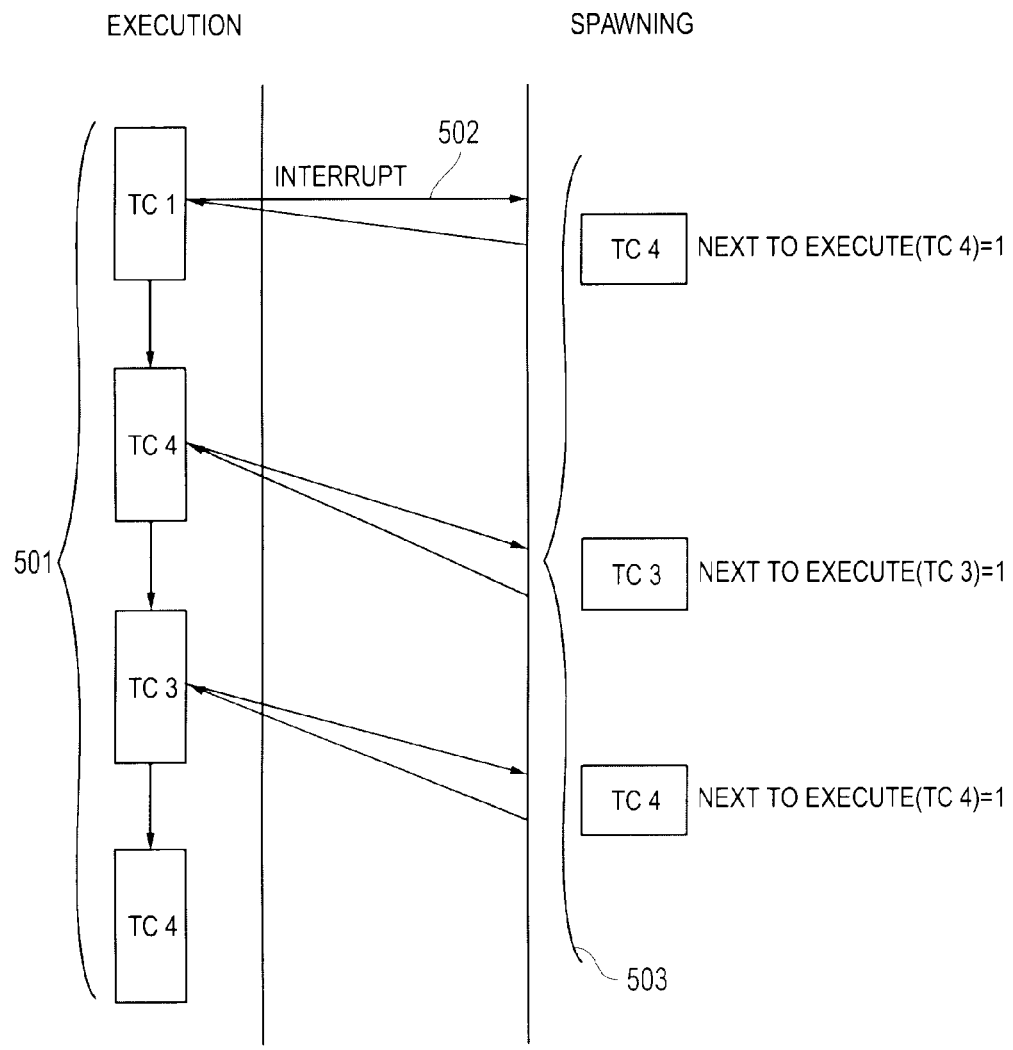
FIG. 5 sets forth a schematic of an execution cycle in accordance with one or more embodiments of the invention.

FIG. 5 depicts a schematic of an exemplary execution cycle of a test program in accordance with one or more embodiments of the invention. The execution cycle 501 includes execution of test cases 1, 4, 3 and 4 in succession. An interrupt 502 is introduced during the execution of each test case. As described earlier, during the interrupt 502, a test case is selected for regeneration and the selected test case is regenerated to spawn a new test case. A flag (e.g. a value of 1) is set for the new test case that identifies it as the next test case to execute in the execution cycle. Execution of the current test case in the execution cycle then resumes. The regeneration of test cases as part of interrupts introduced during the execution of current test cases may be referred to as a spawning cycle 503. The execution cycle 501 may be interpreted as encompassing the spawning cycle 503.

Prior to beginning execution of a selected test case, registers that will be utilized by the instructions included in the test case must be populated with values. The values may be of any type including, but not limited to, floating point, decimal floating point, fixed point, complex values, etc. In accordance with one or more embodiments of the invention, a collection of one or more buckets that include various types of values that are used to populate the registers. The collection of buckets may be generated from information provided in a configuration specification.

Figures 6, 7:
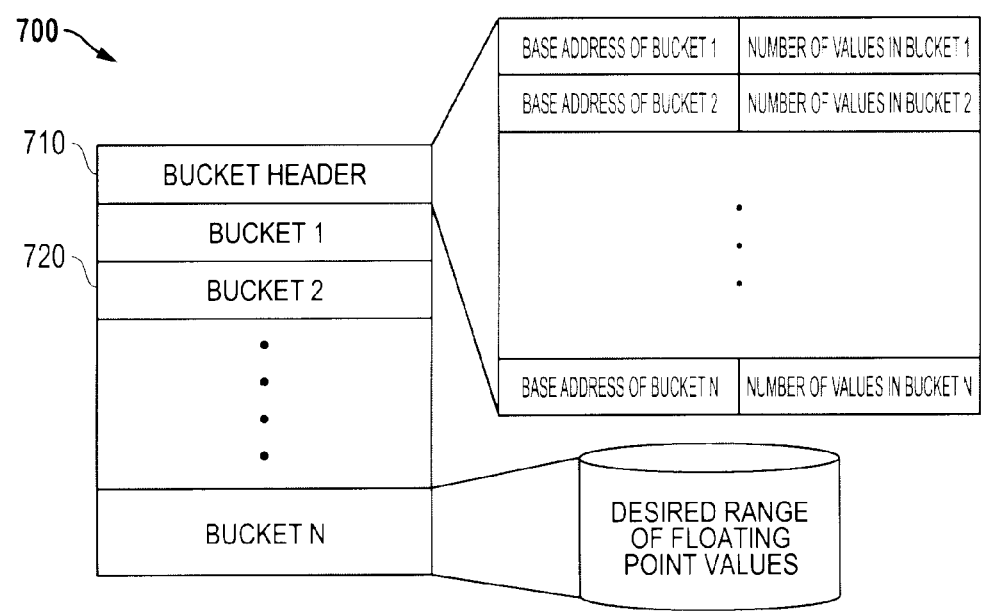
FIG. 6 depicts a configuration specification in accordance with one or more embodiments of the invention.
FIG. 7 depicts a schematic of a bucket collection in accordance with one or more embodiments of the invention.

A configuration specification in accordance with one or more embodiments of the invention is shown in FIG. 6. The configuration specification 600 shown in FIG. 6 includes at least one default category 610 and at least one user pattern 620. However, it should be noted that a configuration specification in accordance with one or more embodiments of the invention may not include any default category or may not include any user pattern. Each default category 610 and each user pattern 620 includes a parameter specifying the number of values to be generated for that category or user pattern. For example, the default categories may include NAN (Not a Number), Normal Numbers, Denorm Numbers, Zeros, Infinities, or various other default categories. The user pattern 620 may be any customized pattern that a user develops. The number of values to be generated for a particular category or user pattern may be any nonnegative integer.

As noted above, the configuration specification 600 specifies the number of values for each default category 610 and each user pattern 620 that need to be generated. A bucket is created for each default category 610 and each user pattern 620 specified in the configuration specification 600 and each bucket is pooled with the specified number of values. For example, if the configuration specification 600 specifies the following combination of default categories/user patterns and associated number of values: NAN—0, Normal Numbers—500, Min Denorm Numbers—256, Zeros—1000, Infinities—0, and User Pattern 1—512, then a total of 4 buckets will be created. More specifically, the following buckets will be created: a bucket for Normal Numbers that includes 500 values of that type, a bucket for Min Denorm Numbers that includes 256 values of that type, a bucket for Zeros that includes 1000 values of that type, and a bucket for User Pattern 1 that includes 512 values of that type. Alternatively, if the configuration specification does not specify a default category and does not specify a user pattern, then a default bucket of values that encompasses a predefined set of categories may be generated.

Each of the buckets created from the configuration specification 600 may be stored together as part of the bucket collection 700 depicted in FIG. 7. The bucket collection includes a bucket header 710 that stores a base address of each bucket 720 and a parameter that specifies a number of values included in each bucket. The base address of each bucket 720 is used to locate the bucket 720. The parameter that specifies the number of values included in a bucket may also be referred to as an offset and may be used to locate a particular value in the bucket that is stored at a particular memory address.

Figure 8:
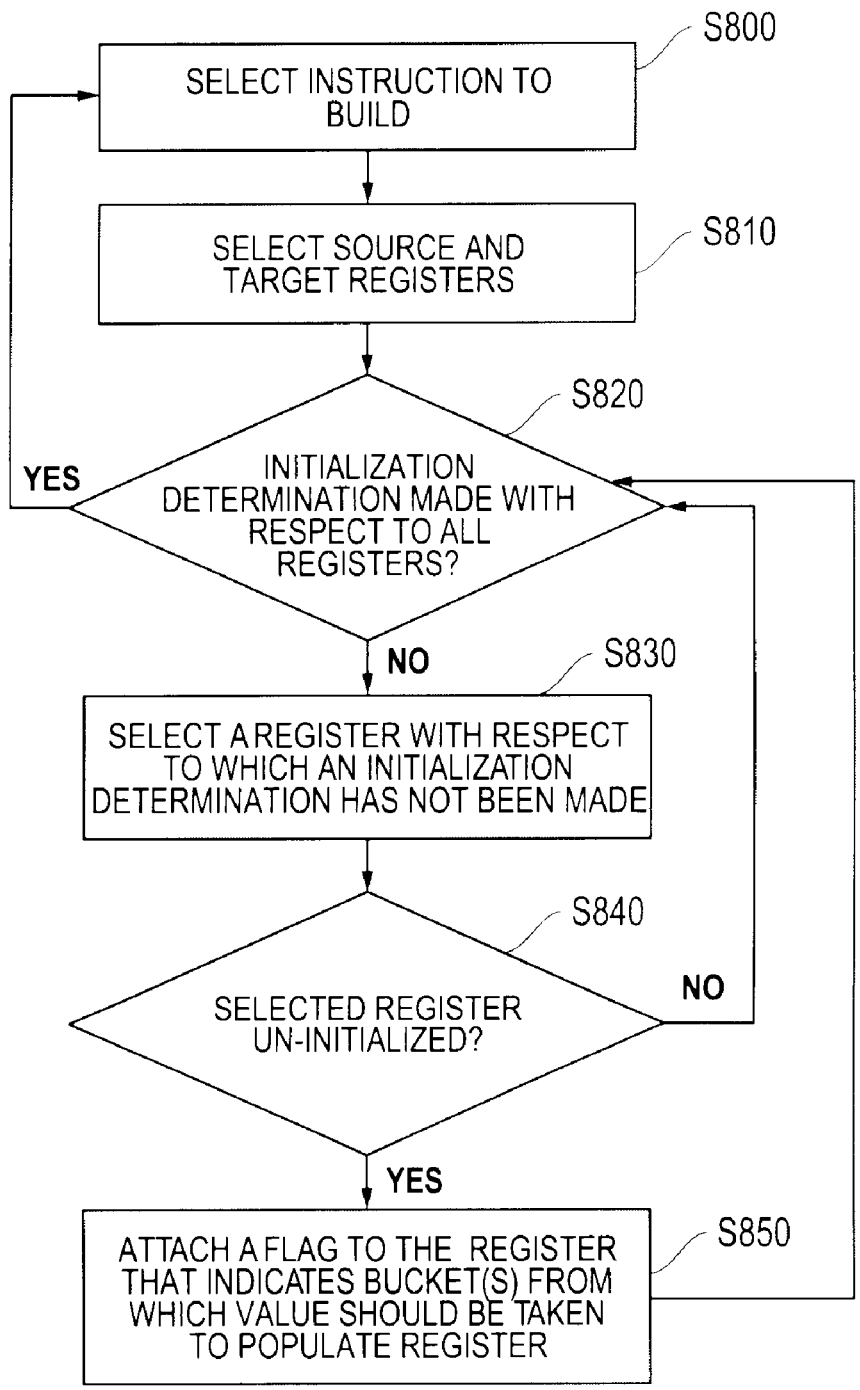
FIG. 8 sets forth a flow chart illustrating a test case build cycle in accordance with one or more embodiments of the invention.

FIG. 8 sets forth a flow chart illustrating a test case build cycle in accordance with one or more embodiments of the invention. As noted earlier, a test program includes a plurality of test cases. Each test case includes one or more instructions from one or more groups of instructions in the instruction group table. In generating a test case, the build cycle depicted in FIG. 8 may be performed. In step S800, an instruction is selected from a group of instructions in the instruction group table. After the instruction is selected, source and target registers that will be utilized during execution of the instruction are selected (S810). In step S820, a determination is made as to whether an initialization determination has been made for all the registers selected in step S810. If it is determined that an initialization determination has been made for all selected registers, then a next instruction is selected from the instruction group table (S800) and the build cycle continues.

On the other hand, if it is determined that an initialization determination has not been made for all selected registers, then a register with respect to which an initialization determination has not been made is selected (S830). Then, in step S840, a determination is made as to whether the selected register has been initialized. If it is determined that the selected register has already been initialized, then the determination in step S820 is once again made. Alternatively, if it is determined that the selected register has not been initialized, a bucket flag is attached to the register (S850). The bucket flag indicates the one or more buckets from which values are to be taken to populate the registers. After the bucket flag is attached to the register, the determination in step S820 is once again made. The cycle continues until it is determined that an initialization determination has been made for all registers that will be utilized during execution of the instruction, at which point another instruction is selected from the instruction group table (S800) and the method continues as described above.

The bucket flag attached to each register may specify the one or more buckets from which values are to be taken to populate the register during execution of a test case. In addition, the bucket flag attached to each register may also indicate the percentage of execution time that the register should be populated with a value selected from one or more buckets. In other words, the bucket flag may indicate the buckets to which a register is mapped and the frequency weight of each mapping.

The table presented below provides an example of how registers (operands) may be mapped to one or more buckets and how percentage weights may be applied to each mapping.

| Operand | Buckets | Percentage Weight (%) |
|---|---|---|
| Source - A | 5, 9, 10 | 10 |
| Source - A | 2, 3, 4 | 30 |
| Source - A | 1 | 30 |
| Source - A | 10, 11 | 25 |
| Source - A | 9 | 5 |
| Source - B | 1, 5, 8 | 25 |
| Source - B | 6, 7 | 40 |
| Source - B | 2, 3 | 35 |
| Source - C | 2, 6, 4 | 70 |
| Source - C | 10, 12, 11 | 30 |

The example table presented above requires that Source register A be populated with values from buckets 5, 9 and 10 for 10% of an execution time, that Source register B be populated with values from buckets 1, 5 and 8 for 25% of an execution time, and so on. As an example, the bucket tag attached to Source Register A for the above example table would indicate that Source register A be populated with values from buckets 5, 9 and 10 for 10% of an execution time, values from buckets 2, 3 and 4 for 30% of the time, values from bucket 1 for 30% of the time, values from buckets 10 and 11 for 25% of the time, and values from bucket 9 for 5% of the time.

Figure 9:
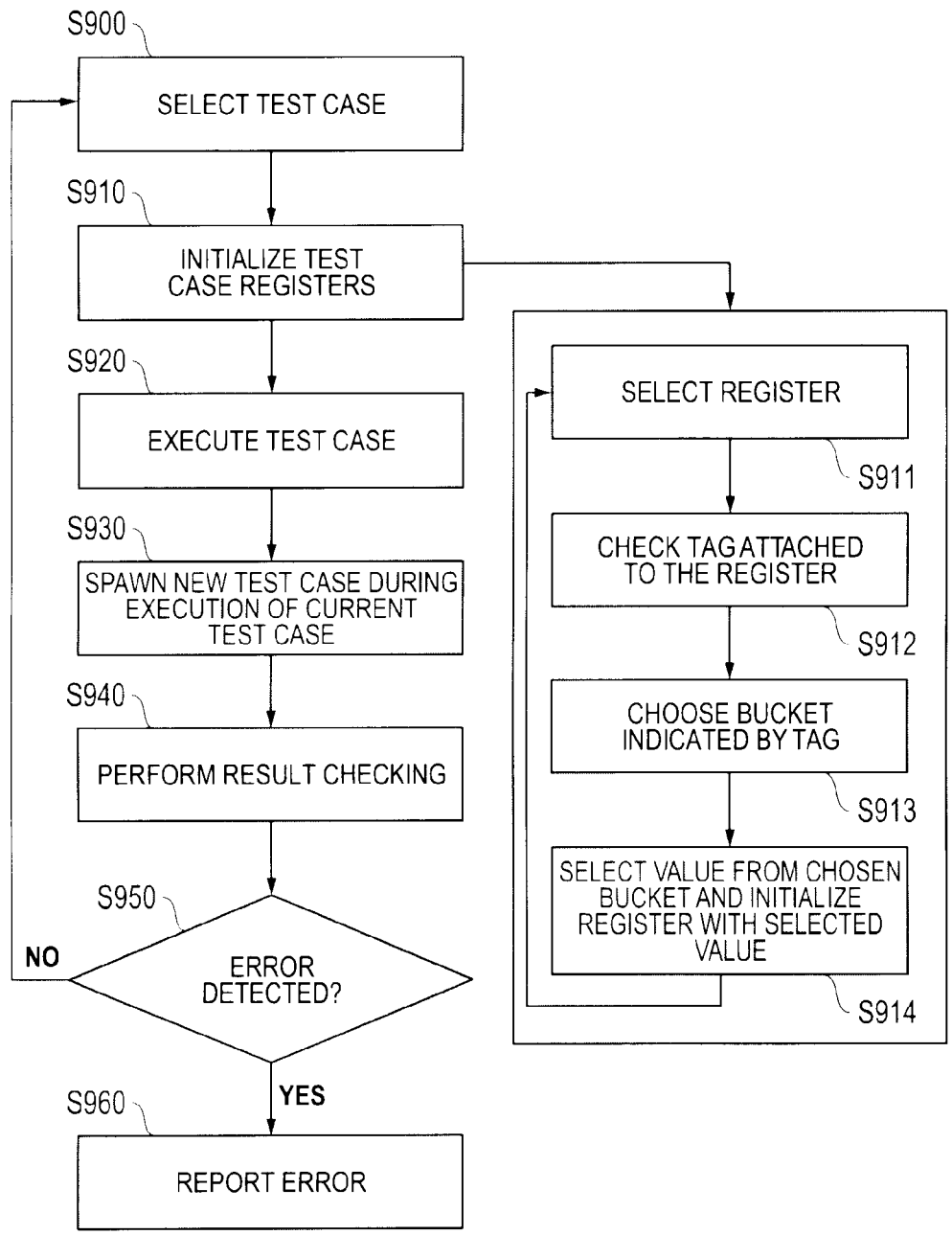
FIG. 9 sets forth a flow chart illustrating a self-generating test program execution cycle in accordance with one or more embodiments of the invention.

FIG. 9 sets forth a flow chart illustrating a test program execution cycle in accordance with one or more embodiments of the invention. In step S900, a test case is selected for execution from among the plurality of test cases included in a test program. As discussed above with reference to FIG. 3, if a test case has a flag associated therewith that indicates that the test case is the next test case to execute, than this test case is selected for execution. If no test case has a flag associated therewith that indicates that the test case is the next test case to execute, a test case is randomly selected for execution. Upon selection of the test case for execution, all registers associated with the selected test case are initialized (S910).

The initialization of all registers associated with the selected test case will be described in greater detail with reference to steps S911-S914. In step S911, a register is selected from among the registers requiring initialization. A bucket tag attached to the register is then checked (S912). Thereafter, a bucket indicated by the bucket tag is chosen (S913). The bucket is accessed by retrieving the base address of the bucket from the bucket header 710 in the bucket collection 700 (FIG. 7). A value is then selected from the chosen bucket and the register is initialized with the selected value (S914). The value may be selected from the bucket by choosing at random a value between 1 and the parameter indicating the number of values in the bucket, adding the randomly chosen value to the base address of the bucket to obtain a memory address, and selecting the value stored at the obtained memory address. Steps S911-S914 are then repeated until all required registers have been initialized.

After all test case registers have been loaded, execution of the test case begins (S920). An interrupt is then introduced in the execution of the current test case, and a new test case is spawned (i.e. generated) from a test case different from the current test case (as described in detail earlier with reference to FIGS. 3 and 4). A flag is then set for the new test case that indicates that the new test case is the next test case to be executed upon completion of the execution of the current test case and validation of the execution results. After the new test case is generated, execution of the current test case resumes, and upon completion of the execution of the current test case, the execution results that are generated are compared to simulated results to determine if an error has occurred (as described earlier in reference to step S340 in FIG. 3). If in step S950, it is determined that an error has occurred, the error is reported (S960). On the other hand, if no error is detected, the test case having the flag that indicates that it is the next test case to be executed is selected for execution (S900), and the method continues as described above.

Figure 10:
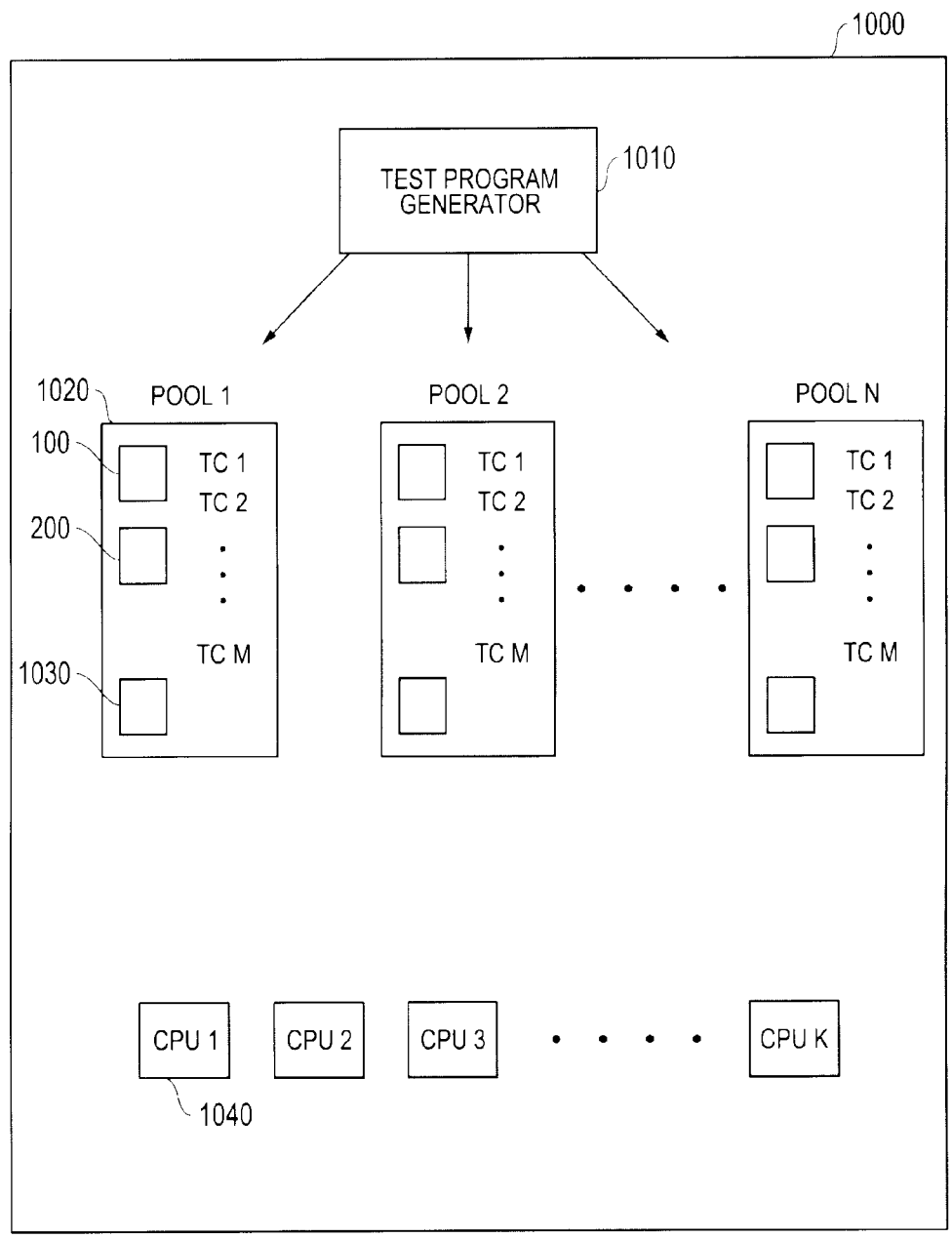
FIG. 10 depicts a system in accordance with one or more embodiments of the invention.

FIG. 10 depicts a system in accordance with one or more embodiments of the invention. The system 1000 includes a plurality of processors 1040 (CPUs) and a test program generator 1010. The test program generator 1010 generates a plurality of test programs, where each test program includes a plurality of test cases. The test program generator 1010 may also generate a plurality of test case pools 1020. Each test case pool 1020 may include one of the plurality of test programs (represented in FIG. 10 as a series of test cases) and the test program information table 200 and instruction group table 100 associated with the test program. Each test case pool may further include simulated CRC results 1030 for at least the test case that has been flagged as the next test case to execute.

Each pool is initially assigned a flag indicating that the pool is ready to be executed. Each pool is ready to be executed as a stand-alone test program on a particular CPU 1040. In one or more embodiments of the invention, the number of pools may be greater than the number of processors (CPUs) to ensure that no processor remains idle waiting to select a pool for execution.

Figure 11:
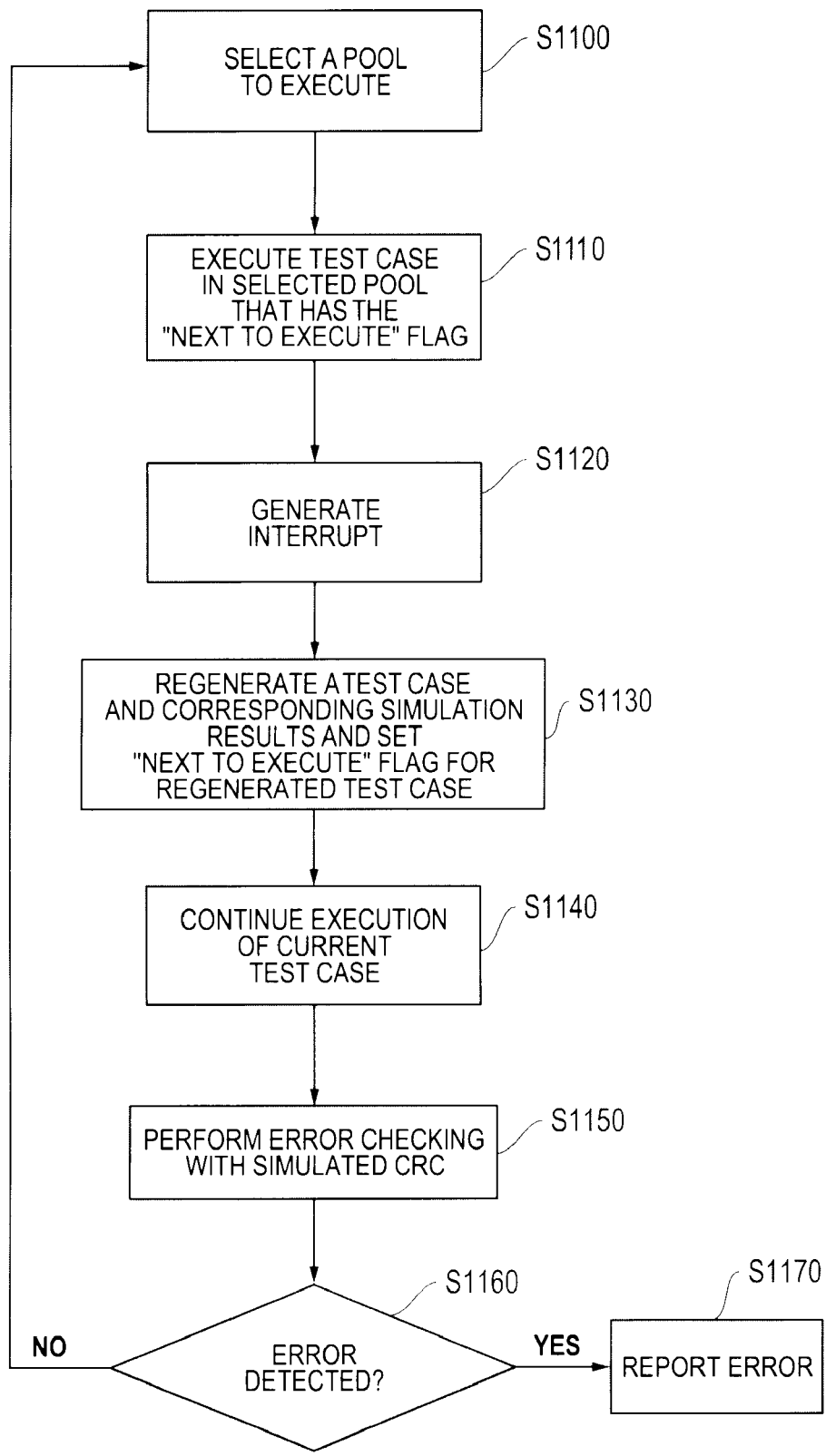
FIG. 11 sets forth a flow chart illustrating a pool execution cycle in accordance with one or more embodiments of the invention.

Execution of the test case pools 1020 by the CPUs 1040 will be described in greater detail through reference to FIG. 11. FIG. 11 sets forth a flow chart illustrating a pool execution cycle in accordance with one or more embodiments of the invention. In an initial step S1100, the CPU 1040 selects a pool for execution. As discussed above, initially a flag is set for each pool indicating that the pool is ready for execution. Thus, initially, any of the CPUs 1040 can select any of the pools 1020 for execution. After the CPU 1040 selects a pool for execution and the pool is scheduled on the CPU 1040 for execution, the "Ready to Execute" flag associated with the selected pool is unset, thereby preventing another CPU from attempting to select the pool for execution.

After the CPU 1040 selects the pool for execution, the CPU, in step S1110, begins execution of the test case included in the pool that has the "Next to Execute" flag set (the "Next to Execute" flag set for a test case indicates that the test case should be executed as the current test case). After the CPU begins executing the current test case, an interrupt is generated, causing a break in the execution of the current test case (S1120). During the interrupt, a test case different from the current test case being executed is selected from among the plurality of test cases included in the selected pool. The selected test case is then regenerated to create a new test case and the "Next to Execute" flag is set for the regenerated test case (i.e. new test case) indicating that the new test case is the next test case to be executed after completion of the execution of current test case (S1130). In addition, simulation results corresponding to the regenerated test case are generated (S1130).

Upon completion of the regeneration of the selected test case to produce the new test case, the CPU 1040 returns from the interrupt and resumes execution of the current test case (S1140). After the execution of the current test case is completed, error checking is performed by comparing the CRC results generated by the CPU to simulated CRC results (S1150). If in step S1160, it is determined that an error exists in the CRC results regenerated by the CPU, the error is reported (S1170). Alternatively, if no error is detected, the "Ready to Execute" flag is once again set for the pool, thereby making the pool available for selection by the same or another CPU. The CPU then proceeds to select a pool for execution from among the pools having the "Ready to Execute" flag set, and the method depicted in FIG. 11 continues as described above. Each CPU 1040 may perform the pool execution cycle any number of times, or may perform the pool execution cycle a predetermined number of times.

Figure 12:
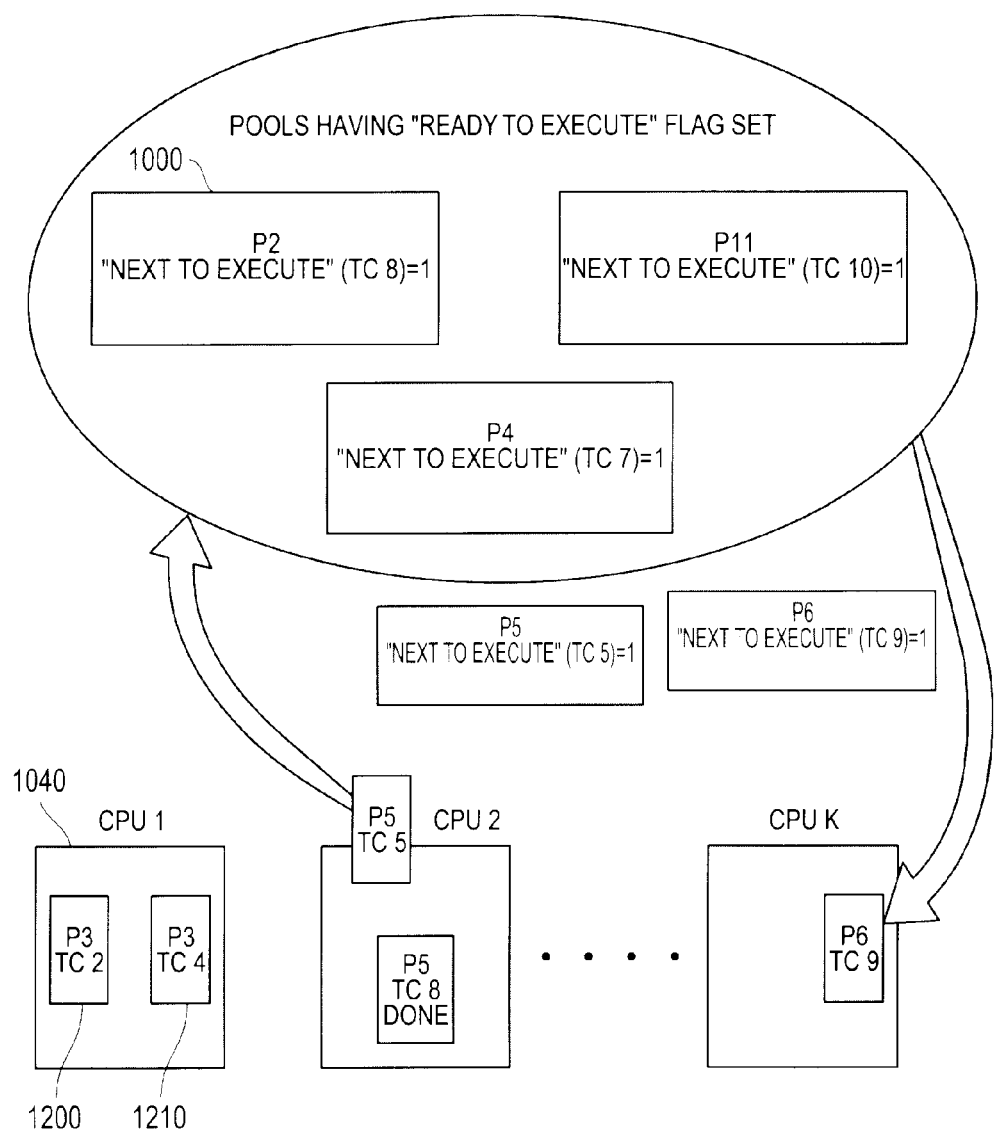
FIG. 12 depicts a snapshot of processor verification testing in accordance with one or more embodiments of the invention.

FIG. 12 provides an example snapshot of pool execution cycles being executed by various CPUs in accordance with one or more embodiments of the invention. Each CPU 1040 selects a pool for execution from among the pools having the "Ready to Execute" flag set. In the example execution snapshot of FIG. 12, each CPU is in a different stage of execution. In this example, CPU 1 has selected Pool 3 (P3) for execution. Further, in this example, CPU 1 is currently executing test case 2 (1200) and has regenerated test case 4 (1210). CPU 2, on the other hand, has regenerated test case 5, has set the "Next to Execute" flag for this test case, and has completed the execution of test case 8. CPU 2 is in the process of setting the "Ready to Execute" flag for the pool indicating that the pool is again available for selection by any CPU. CPU K has selected Pool 6 (P6) for execution and has unset, or is in the process of unsetting, the "Ready to Execute" flag for the pool.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose.

It should be understood that the inventive concepts disclosed herein are capable of many modifications. To the extent such modifications fall within the scope of the appended claims and their equivalents, they are intended to be covered by this patent.

What is claimed is:

1. A method for creating a self-generating test program, the method comprising:
    generating a plurality of groups of instructions and storing the groups of instructions in an instruction group table, wherein instructions sharing a same instruction format are included in a same group;
    generating a plurality of test cases and storing information pertaining to each test case in a test program information table, wherein each test case includes one or more instructions from one or more of the plurality of groups; and
    performing an execution cycle, the execution cycle including:
        selecting a first test case for execution, wherein on the condition that a test case has been flagged as a next test case to execute in the execution cycle, the flagged test case is selected as the first test case;
        executing the first test case;
        introducing a break in the execution of the first test case and during the break in execution:
            selecting a second test case from among the plurality of test cases that is different from the first test case;
            generating a new test case from the selected second test case; and
            assigning a flag to the new test case that indicates that the new test case is the next test case to execute in the execution cycle; and
        resuming execution of the first test case,
    wherein the execution cycle is repeated on the condition that an execution result of the first test case is validated.

2. The method of claim 1, wherein the break in the execution of the first test case is caused by a hardware interrupt and the new test case is generated as part of an interrupt handler routine.

3. The method of claim 1, the generating a new test case comprising:
    replacing an instruction that is referenced by an instruction address in a portion of the test program information table pertaining to the selected second test case with a randomly selected instruction from a same group based on information retrieved from the instruction group table.

4. The method of claim 3, wherein the test program information table comprises:
    header information that specifies a number of test cases included in the test program information table; and
    information pertaining to each test case that is included in the test program information table,
    wherein the information pertaining to each test case includes:
        a base address of each group of instructions included in the test case;
        an AND mask for each of group of instructions included in the test case;
        an instruction count that specifies a number of instructions included in the test case from each group of instructions; and
        an address of each instruction included in the test case.

5. The method of claim 1, further comprising:
    after generating the new test case, comparing a result of the execution of the first test case with a simulated result to determine whether an error has occurred;
    reporting the error on the condition that an error has occurred; and
    continuing the execution cycle on the condition that an error has not occurred and the result of the execution of the first test case has been validated.

6. The method of claim 1, the generating a plurality of test cases comprising:
    performing a build cycle for each test case, the build cycle including:
        selecting an instruction included in the test case;
        selecting at least one register;
        determining whether the at least one register has been initialized; and
        on the condition that the at least one register has not been initialized, attaching a bucket tag to the at least one register that specifies at least one bucket from which a value is selected to initialize the at least one register,
    wherein the build cycle is repeated for each instruction included in the test case.

7. The method of claim 6, the execution cycle further comprising:
    after selecting the first test case and prior to executing the first test case, performing an initialization cycle, the initialization cycle including:
        selecting a register;
        identifying the bucket tag attached to the selected register;
        selecting a bucket associated with the bucket tag from a bucket collection;
        selecting a value from the selected bucket; and
        initializing the register with the selected value,
    wherein the initialization cycle is repeated for each register associated with the first test case.

8. The method of claim 7, wherein the bucket collection is generated from a configuration specification that specifies:
    one of more default categories and/or one or more user defined patterns of values; and
    a number of values to be generated for each default category and each user defined pattern.

9. The method of claim 8, wherein the bucket collection includes:
    one or more buckets, each bucket including values corresponding to one default category or one user defined pattern; and
    a bucket header that includes therein a base address of each bucket and a parameter associated with each bucket that specifies a number of values in each bucket.

10. The method of claim 9, wherein the bucket associated with the bucket tag is selected by locating the base address associated with the bucket from within the bucket collection, and the value is selected from the bucket by:
- randomly selecting an integer between 1 and the parameter associated with the bucket;
- locating a memory address obtained by adding the randomly selected integer to the base address of the bucket; and
- selecting the value at the located memory address.

11. The method of claim 7, wherein the bucket tag attached to a register specifies:
- one or more buckets from which a value is selected to initialize the register; and
- a percentage of time that the register is initialized with a value selected from the one or more buckets.

12. The method of claim 9, wherein the values included in each bucket include at least one of floating point values, decimal floating point values, fixed point values, and complex values.

13. A method for testing a plurality of processors, the method comprising:
- generating a plurality of self-generating test programs in accordance with the method of claim 1;
- generating a plurality of pools, wherein each pool includes one of the plurality of self-generating test programs and the instruction group table and the test program information table associated with the test program; and
- setting a flag for each of the plurality of pools indicating that the pool is ready to be executed,
- wherein each of the plurality of processors performs a pool execution cycle one or more times, the pool execution cycle including:
  - selecting a pool that is ready to be executed from among the plurality of pools and unsetting the flag for the selected pool;
  - performing the execution cycle of the self-generating test program included in the selected pool; and
  - setting the flag indicating that the pool is ready to be executed upon completion of the execution cycle of the self-generating test program.

14. A system comprising:
a plurality of processors; and
a test program generator that generates:
- a plurality of self-generating test programs in accordance with the method of claim 1; and
- a plurality of pools, wherein each pool includes one of the plurality of self-generating test programs and the associated instruction group table and test program information table;
wherein:
each of the plurality of pools has a flag associated therewith that is initially set to indicate that the pool is ready to be executed, and
each processor performs a pool execution cycle one or more times, the pool execution cycle including:
- selecting a pool that is ready to be executed from among the plurality of pools and unsetting the flag associated with the selected pool;
- performing the execution cycle of the self-generating test program included in the selected pool; and
- setting the flag indicating that the pool is ready to be executed upon completion of the execution cycle of the self-generating test program.

15. The system of claim 14, wherein the new test case is generated by replacing each instruction referenced by an instruction address in a portion of the test program information table pertaining to the selected second test case with a randomly selected instruction from a same group based on information retrieved from the instruction group table.

16. The system of claim 15, wherein the test program information table comprises:
- header information that specifies a number of test cases included in the test program information table; and
- information pertaining to each test case that is included in the test program information table, wherein the information pertaining to each test case includes:
  - a base address of each group of instructions included in the test case;
  - an AND mask for each of group of instructions included in the test case;
  - an instruction count that specifies a number of instructions included in the test case from each group of instructions; and
  - an address of each instruction included in the test case.

17. The system of claim 14, the execution cycle of the self-generating test program further comprising:
- after generating the new test case, comparing a result of the execution of the first test case with a simulated result to determine whether an error has occurred;
- reporting the error on the condition that an error has occurred; and
- continuing the execution cycle on the condition that an error has not occurred and the result of the execution of the first test case has been validated.

18. The system of claim 14, wherein a build cycle is performed for each test case, the build cycle including:
- selecting an instruction included in the test case;
- selecting at least one register;
- determining whether the at least one register has been initialized; and
- on the condition that the at least one register has not been initialized, attaching a bucket tag to the at least one register that specifies at least one bucket from which a value is selected with which to initialize the at least one register,
wherein the build cycle is repeated for each instruction included in the test case.

19. The system of claim 18, the execution cycle further comprising:
- after selecting the first test case and prior to executing the first test case, performing an initialization cycle, the initialization cycle including:
  - selecting a register;
  - identifying the bucket tag attached to the selected register;
  - selecting a bucket associated with the bucket tag from a bucket collection;
  - selecting a value from the selected bucket; and
  - initializing the register with the selected value,
wherein the initialization cycle is repeated for each register associated with the first test case.

20. The system of claim 19, further comprising:
a configuration specification that specifies:
- one of more default categories and/or one or more user defined patterns of values; and
- a number of values to be generated for each default category and each user defined pattern,
wherein the bucket collection is generated from information in the configuration specification.

21. The system of claim 20, wherein the bucket collection includes:
   one or more buckets, each bucket including values corresponding to one default category or one user defined pattern; and
   a bucket header that includes therein a base address of each bucket and a parameter associated with each bucket that specifies a number of values in each bucket.

22. The system of claim 21, wherein the bucket associated with the bucket tag is selected by locating the base address associated with the bucket from within the bucket collection, and the value is selected from the bucket by:
   randomly selecting an integer between 1 and the parameter associated with the bucket;
   locating a memory address obtained by adding the randomly selected integer to the base address of the bucket; and
   selecting the value at the located memory address.

23. A non-transitory computer-readable medium storing a computer program comprising instructions for causing a computer to perform a process, the process comprising:
   generating a plurality of self-generating test programs in accordance with the method of claim 1;
   generating a plurality of pools, wherein each pool includes one of the plurality of self-generating test programs and the associated instruction group table and test program information table,
   wherein each of the plurality of pools has a flag associated therewith that is initially set to indicate that the pool is ready to be executed, and
   performing a pool execution cycle one or more times, the pool execution cycle including:
      selecting a pool that is ready to be executed from among the plurality of pools and unsetting the flag associated with the selected pool;
      performing the execution cycle of the self-generating test program included in the selected pool; and
      setting the flag indicating that the pool is ready to be executed upon completion of the execution cycle of the self-generating test program.

* * * * *